US009167453B2

(12) United States Patent  (10) Patent No.: US 9,167,453 B2
Kapnadak et al.  (45) Date of Patent: Oct. 20, 2015

(54) CELL AND EVOLVED NODE B STATION OUTAGE RESTORATION TOOL

(71) Applicant: AT&T Intellectual Property I, L.P., Atlanta, GA (US)

(72) Inventors: Vibhav Kapnadak, Milpitas, CA (US); Zhi Li, San Ramon, CA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 143 days.

(21) Appl. No.: 14/088,719

(22) Filed: Nov. 25, 2013

(65) Prior Publication Data

US 2015/0146547 A1  May 28, 2015

(51) Int. Cl.
*H04L 12/26* (2006.01)
*H04L 12/28* (2006.01)
(Continued)

(52) U.S. Cl.
CPC .......... *H04W 24/04* (2013.01); *H04W 28/0236* (2013.01)

(58) Field of Classification Search
CPC ..... H04W 16/00; H04W 16/18; H04W 16/22; H04W 16/24; H04W 24/00; H04W 24/02; H04W 24/04; H04W 24/08; H04W 24/10; H04W 28/0236; H04W 36/0055; H04W 36/0061; H04W 36/08; H04W 36/16; H04W 36/22; H04W 36/24; H04W 36/26; H04W 36/30; H04W 36/32; H04W 36/165; H04W 36/245; H04W 48/18; H04W 76/02; H04L 12/189; H04L 41/0654; H04L 41/0823; H04L 41/0886; H04L 41/0853; H04L 41/12; H04L 41/14; H04L 41/22; H04L 41/142; H04L 41/145; H04L 41/147; H04L 41/5012; H04L 43/065; H04L 43/08; H04L 43/10; H04L 69/24; H04L 47/12; H04L 47/122; G06F 11/34; H04B 10/0793; H04B 10/95; H04H 20/59
USPC ................. 370/229–240, 241–258, 310–350, 370/400–401, 497–498, 522; 455/421–466
See application file for complete search history.

(56) References Cited

U.S. PATENT DOCUMENTS 8,184,594 B2  5/2012  Li et al.
8,406,160 B2  3/2013  Sureshchandran et al.
(Continued)

FOREIGN PATENT DOCUMENTS

AU  2008353507 A1  10/2009
AU  2010208556 A1  9/2011
(Continued)

*Primary Examiner* — Tri H Phan
(74) *Attorney, Agent, or Firm* — Amin, Turocy & Watson, LLP

(57) ABSTRACT

During scheduled or unscheduled wireless communication outage, restoration of crucial or critical cell site devices and/or base station device are prioritized. The system filters current key performance indicator values and historical key performance indicator values for a reference cell device to produce a filtered key performance indicator metric for the reference cell device, filters statistical data to produce filtered statistical data representing a filtered statistic for the reference cell device, determines a weighting factor for the reference cell device, and displays of a ranking score determined as a function of the weighting factor, the filtered statistic data, and the filtered key performance indicator metric. The ranking score provides an ordering that can be used to restore critical cell site devices and/or base station devices.

20 Claims, 11 Drawing Sheets

(51) Int. Cl.
*H04W 4/00* (2009.01)
*H04J 3/14* (2006.01)
*H04W 24/00* (2009.01)
*H04W 24/04* (2009.01)
*H04W 28/02* (2009.01)

(56) References Cited

U.S. PATENT DOCUMENTS

| | | |
|---|---|---|
| 8,463,259 B2 | 6/2013 | Sokondar et al. |
| 8,493,870 B2 | 7/2013 | Calippe et al. |
| 8,825,064 B2 * | 9/2014 | Rai et al. .................. 455/448 |
| 8,996,000 B2 * | 3/2015 | Henderson et al. ........ 455/435.1 |
| 2009/0116378 A1 | 5/2009 | Jen |
| 2010/0316096 A1 | 12/2010 | Adjakple et al. |
| 2011/0143743 A1 | 6/2011 | Pollakowski et al. |
| 2011/0280118 A1 | 11/2011 | Maharana et al. |
| 2012/0013748 A1 | 1/2012 | Stanwood et al. |
| 2012/0254611 A1 | 10/2012 | Fukuda et al. |
| 2012/0275391 A1 | 11/2012 | Cui et al. |
| 2013/0310046 A1 * | 11/2013 | Wegmann et al. ............ 455/438 |
| 2014/0045500 A1 * | 2/2014 | Dimou et al. ................. 455/436 |
| 2014/0120930 A1 * | 5/2014 | Harris et al. ................ 455/452.1 |
| 2014/0355484 A1 * | 12/2014 | Foster et al. .................. 370/255 |
| 2015/0095418 A1 * | 4/2015 | Davis ............................ 709/204 |

FOREIGN PATENT DOCUMENTS

| | | |
|---|---|---|
| EP | 1562390 A1 | 8/2005 |
| EP | 2252127 A1 | 11/2010 |
| EP | 2461519 A1 | 6/2012 |
| EP | 2345278 B1 | 10/2012 |
| GB | 2455818 A | 6/2009 |
| GB | 2484117 A | 4/2012 |
| GB | 2498750 A | 7/2013 |
| WO | 2007089797 A2 | 8/2007 |
| WO | 2011134123 A1 | 11/2011 |
| WO | 2012051961 A1 | 4/2012 |
| WO | 2012123023 A1 | 9/2012 |
| WO | 2013075665 A1 | 5/2013 |

* cited by examiner

CELL AND EVOLVED NODE B STATION OUTAGE RESTORATION TOOL

TECHNICAL FIELD

The disclosed subject matter relates to a real time self healing cell site and evolved Node B (eNodeB) station device outage restoration tool applicable, for example, in self organizing networks.

BACKGROUND

When disruptive and/or operational multiple access wireless communication network outage problems occur, for example, due to natural disasters, scheduled and/or unscheduled outages, and/or other unforeseen circumstances, restoration of cell sites, and/or eNodeB stations devices that can control respective cell sites, in an orderly fashion can be of paramount importance given the current preference of many in the populace to exclusively employ the functionalities and facilities provided by multiple access wireless communication networks/infrastructures.

DETAILED DESCRIPTION

Figure 1:
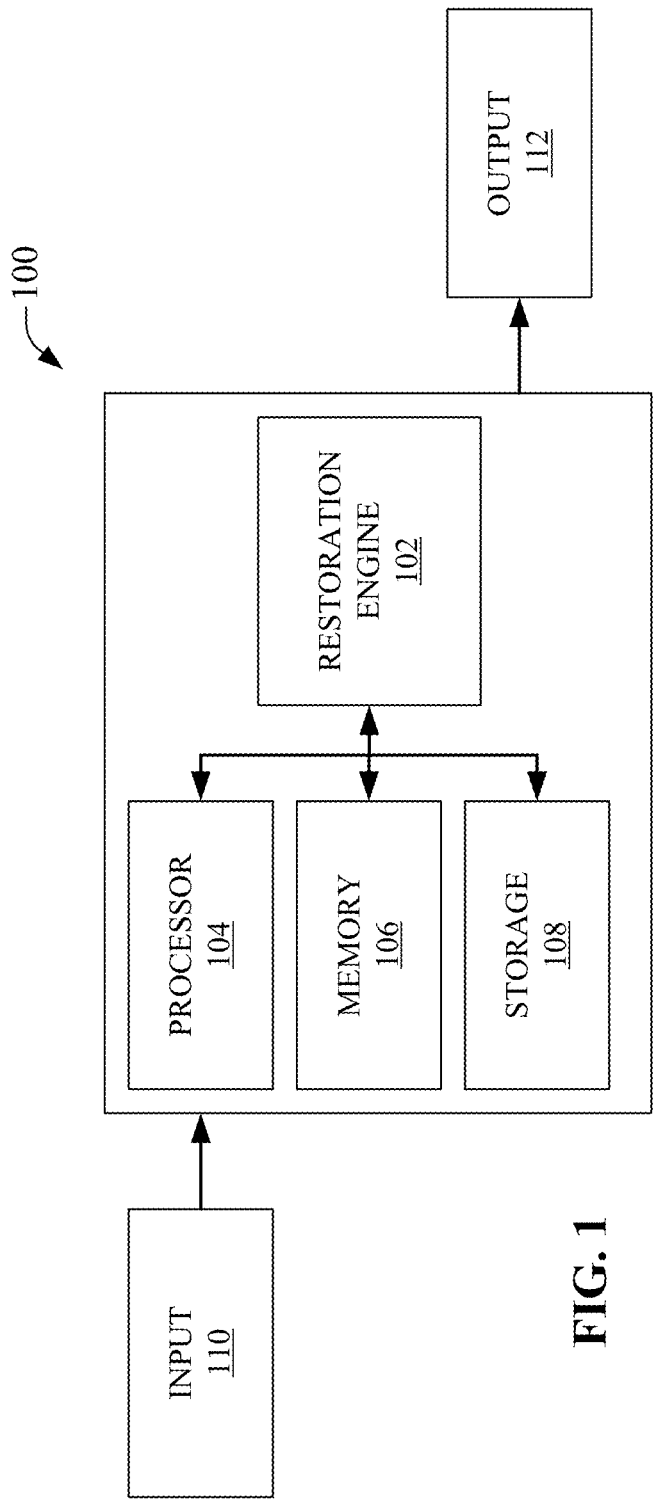
FIG. 1 is an illustration of a system for restoring cell sites and/or eNodeB station devices after a scheduled and/or unscheduled wireless communication outage in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

When there is a natural disaster or other operational outage there is a need to prioritize which cell sites and/or eNodeB station devices should be remediated first. Currently, there is no mechanism to identify the key sites (e.g. sites that when revived that would yield the greatest possible benefit to the overall functionality of the multiple access wireless communication network/infrastructure and/or a geographical area particularly or specifically affected by the natural disaster or other operational challenges) necessary to bring the multiple access wireless communication network/infrastructure (or a geographic portion thereof) back to full functionality.

Currently there is no tool that prioritizes or highlights cell sites, sets or groups of cell sites and/or sets or groups of eNodeB station devices, that should be brought online in preference to other sets or groups of cells sites and/or other sets or groups of eNodeB station devices. It should be noted in this regard, that for the purposes of the subject disclosure, that a set or group of cell sites and/or sets or groups of eNodeB station devices is not inclusive of an empty set or a null set.

In order to remedy the foregoing and current omission, the subject disclosure provides systems and/or method that rank orders cell sites and/or eNodeB station devices that should be brought back or restored in order of greatest import and impact to the functionality of the multiple access wireless communication network/infrastructure. The subject disclosure rank orders cell sites and/or eNodeB station devices as a function of the order in which each cell site and/or eNodeB station device should be restored or brought back online, thereby ensuring disruptions to the multiple access wireless communication networks/infrastructure are obviated or at the very least mitigated and/or minimized.

In order to achieve and/or facilitate this aim, the subject application uses historical data from each cell site and/or eNodeB station device to provide a relative ranking of importance of the cell site and/or eNodeB station device to the overall facility and/or functioning of the multiple access wireless communication network/infrastructure (or a geographical portion thereof) that can have suffered a deficiency due to a scheduled or unscheduled network outage or due to a natural disaster or other unscheduled disruption.

The functionality provided by the subject disclosure is performed in real-time rather than over an extended period of time. The multiple access wireless communication network/infrastructure can be viewed or perceived as a dynamic and mutable entity; an entity that is in a perpetual state of flux. For instance, certain aspects of a geographically diverse multiple access wireless communication network can be subject to scheduled and/or unscheduled outages, such that the composition and functionality of the geographically diverse and disparate multiple access wireless communication network/infrastructure can change from one instance of time to another instance of time, and wherein the likelihood that the entirety of the multiple access wireless communication networks/infrastructure will remain statically and identically configured over time is extremely remote. The subject disclosure therefore provides its results in real time and as a function of the alterable and/or persistently mutable nature of multiple access wireless communication networks/infrastructures.

The subject application takes as input current and historical key performance indicators (KPIs) values (e.g., voice erlangs, data traffic, short message service (SMS) traffic, carried and/or offered loads on the cell site), network topology, and cell site relation information, such as those based on handover (HO) statistics. The time window and granularity over which information is collected and processed can be variable and can be set by the multiple access wireless communication network/infrastructure provider/operator.

The key performance indicator values, employed in the subject disclosure, can first be filtered using a generic filtering algorithm/process, such as, simple moving average, cumulative moving average, weighted moving average, exponential weighted moving average, and the like, which can combine current and historical key performance indicator information within a specified time window to produce a post processed value for the key performance indicator metric that can be denoted as (Filtered_KPI)$_j$ for each reference cell site j.

The next factor that the subject disclosure can consider is handover statistics, the total number of handovers that can have occurred in a defined time window between a reference cell site j and each of its neighbors, is filtered and weighted using the same or a similar filtering algorithm/process as utilized in the context of key performance indicator values. The post processed handover metric for a particular reference cell site j can be denoted as (Filtered_HO)$_j$.

A further factor that can be considered by the subject disclosure can be based on using the network topology, wherein a distance weighting factor can be constructed that weights the contributions from neighboring cell sites based on the distance between the reference cell site j and each of its neighbors. This metric can be determined as follows: first, using the network topology information obtained for example from a database or network topologies typically maintained by a multiple access wireless communication network provider/carrier, a distance between a reference cell site j and each of its neighboring cell sites defined in the network topology can be determined. This set of distances can be denoted as $D_{net\_top}$. Next, using the handover statistics, also maintained in one or more databases typically maintained by the multiple access wireless communication network provider/carrier, the number of neighbor cell sites that have contributed to a percentage value (x %) of the total handovers that have occurred during a defined period of time can be identified. Based on, or as a function of, the handover statistics and the set of distances between reference cell site j and each of its neighboring cell sites, a respective distance from reference cell site j and to each of the neighbor cell sites that have contributed to a percentage value (x %) of the total handovers can be determined. This set of distances can be denoted as $D_{HO\_stat}$. Using the set of distances $D_{HO\_stat}$, a weighting function for the reference cell site j can be constructed. This weighting function can be denoted as $W_j$ which measures the cardinality (e.g., a measure of the "number of elements included in the set") of the set of distances $D_{HO\_stat}$.

Based on the foregoing, a cell site ranking score value for a reference cell site j can be constructed as: Cell_Ranking_Score$_j$=(Filtered_KPI$_j$+Filtered_HO$_j$)×W$_j$. Further, using the foregoing cell site ranking score (Cell_Ranking_Score), an eNodeB station device ranking score can be determined for a reference eNodeB station device j using the formula: eNodeB_Ranking_Score$_j$=$\Sigma_{i=1}^{N_i}$Cell_Ranking_Score$_i$, where $N_i$ is the number of cell sites controlled by reference eNodeB station device j.

As has been noted earlier, the foregoing determinations and/or Cell_Ranking_Score and/or eNodeB_Ranking_Score can be performed in real time, consequently it will be appreciated by those of ordinary skill that the subject application can produce results in real time. The subject disclosure as described and disclosed herein, therefore efficiently and in real time provides a cell site and/or eNodeB station device restoration priority ranking metric; the defined metric accounts for all the relevant key performance indicator factors and assigns an optimal weight to each cell site and/or to each eNodeB station device to reflect its relative importance and priority for restoration during outage and disaster recovery scenarios. Accordingly, the system and methods disclosed and described herein can reduce the cost of restoring and troubleshooting wireless networks through the provision of real-time metrics that can aid a network operator to efficiently and quickly identify and repair cell sites and/or eNodeB station devices during outage scenarios. This minimizes the time to restore cell sites and/or eNodeB station devices, and hence to provide wireless coverage to critical areas and improved customer experience.

In accordance with an embodiment, the subject disclosure describes a system comprising a memory to store executable instructions, and a processor, coupled to the memory, that facilitates execution of the executable instructions to perform operations. The operations can include receiving, from the memory, a local database, and/or a remotely located database, a current key performance indicator value, topology data representing a geographically relevant network topology (e.g., a network topology within which at least a first cell device cell device is located), and statistical data representing a statistic related to a number of transfers of wireless service from a first cell device to a second cell device, wherein the current key performance indicator value is a measure of a current load on the first cell device and/or the current key performance indicator value is a metric related to a number of simultaneous/concurrent voice calls that are being service by the first cell device in (or during) the defined time period. Further operations performed by the system can include filtering the current performance indicator value for the first cell device over a defined time period to produce a filtered key performance indicator metric for the first cell device, filtering the statistical data over the defined time period to produce filtered statistical data representing a filtered statistic for the first cell device of the number of transfers of wireless service from the first cell device to the second cell device, determining, as a function of the topology data, a weighting factor for the first cell device based on distance data representing a distance between the first cell device and the second cell device and the number of transfers of wireless service from the first cell device to the second cell device; and initiating display of a cell ranking score for the first cell device as a function of the weighting factor for the first cell device, the filtered key performance indicator metric for the first cell device, and the filtered statistical data for the first cell device.

Additional operations that can be performed by the system can also include receiving, from the memory, a local storage device, and/or a remotely situated database, a historical key performance indicator value and filtering the historical performance indicator value for the first cell device and the current key performance indicator value for the first cell device over the defined time period to produce the filtered key performance indicator for the first cell device, aggregating the cell ranking score for cell devices included in a coverage area of a base station device to produce a base station device ranking score for the base station device, and initiating display of the base station device ranking score, wherein the first cell device and the second cell device are included in the coverage area of the base station device, and the base station device is included in the topology data.

In accordance with a further embodiment, the subject disclosure describes a method, comprising a series of acts that include obtaining, by a system comprising a processor, a historical key performance indicator value, topology data representing a network topology, and statistical data representing a metric related to a number of transfers of wireless service from a reference cell device to a neighbor cell device; applying a filtering process to the historical performance indicator value for the reference cell device to produce a filtered key performance indicator metric for the reference cell device; applying the filtering process to the statistical data for the reference cell device to produce a filtered handover metric related to the number of transfers of wireless service from the reference cell device to the neighbor cell device; determining a weighting factor for the reference cell device using the topology data and the number of transfers of wireless service from the reference cell device to the neighbor cell device, wherein the topology data provides, or enables determination of, a distance between the reference cell device and the neighbor cell device; and initiating display of a cell ranking score for the reference cell device as a function of the weighting factor for the reference cell device, the filtered handover metric for the reference cell device, and the filtered key performance indicator metric for the reference cell device.

In the context of the filtering process a weighted moving average process or algorithm and/or an exponential weighted moving average process or algorithm can be used. Further, in the context of the historical key performance value, in accordance with an embodiment, the historical key performance indicator value can be a metric related to a quantity of data traffic passing through the reference cell device in a defined unit of time. Additionally, in accordance with a further embodiment, the historical key performance indicator value can be a metric related to an amount of data related to a text message service using the reference cell device as a conduit for communication with a network device associated with a multiple access wireless communication network.

Additional acts that can also include aggregating the cell ranking score for the reference cell device with a cell ranking score determined for the neighbor cell device to determine an eNodeB station device ranking score for a reference eNodeB station device, wherein the reference eNodeB station device includes or comprises the reference cell device, and initiating display of the eNodeB station device ranking score for the reference eNodeB station device, wherein the eNodeB station ranking score is color coded as a function of a priority ordering placed on restoration of the reference eNodeB station device relative to the neighbor cell device included in a geographic segment of a multiple access wireless communication network represented by the topology data.

In accordance with a still further embodiment, the subject disclosure describes a computer readable storage device comprising instructions that, in response to execution, cause a computing system comprising a processor to perform operations. The operation can include filtering a current key performance indicator value for a reference cell device and a historical key performance indicator value for the reference cell device to produce a filtered key performance indicator metric for the reference cell device related to a defined time horizon, filtering statistical data to produce filtered statistical data representing a filtered statistic for the reference cell device related to the defined time horizon, determining a weighting factor for the reference cell device as a function of a distance between the reference cell device and a cell device in proximity to the reference cell device, wherein the distance is obtained from topology data representing a network topology that includes or comprises the reference cell device and the cell device in proximity to the reference cell device, and initiating display of a ranking score for the reference cell device, wherein the ranking score for the reference cell device is determined as a function of the weighting factor for the reference cell device, the filtered statistical data for the reference cell device, and the filtered key performance indicator metric for the reference cell device.

An additional operation can include adding the ranking score for the reference cell device and another ranking score determined for the cell device proximate with the reference cell device to determine a reference base station device ranking score, wherein a reference base station device broadcast area includes or comprises or comprises a broadcast area of the reference cell device and the cell device proximate to the reference cell device.

In accordance with this aspect, the reference base station device ranking score can be color coded to indicate a comparative ordering between the reference base station device and another base station device included in the network topology data, and the ranking score for the reference cell device can be color coded to indicate a comparative ordering between the reference cell device and the cell device in proximity to the reference cell device. Further, the current performance value can be related to a defined quantity of data passing through the reference cell device during a defined unit of time, and the historical performance value is offered load data related to an available capacity on the reference cell device.

With reference now to the Figures. FIG. 1 illustrates a system 100 for restoring cell site and/or evolved Node B (eNodeB) station devices after a scheduled and/or unscheduled outage. System 100 can efficiently and in real time provide cell site and eNodeB station device restoration priority ranking metrics, wherein the restoration priority ranking metrics account for all relevant key performance indicator (KPI) factors and assigns optimal weights to each cell site and/or eNodeB station device to reflect the cell site and/or eNodeB station device importance and/or priority for restoration of service during outages and/or disaster recovery scenarios. By using the functionalities and/or facilities provided by system 100, reductions in the costs associated with restoring and/or troubleshooting multiple access wireless communication networks/infrastructures (e.g., radio access networks) through the provision of real time metrics can be attained. The real time metrics can be utilized or employed by network operators to efficiently and expeditiously identify and repair cell sites and/or eNodeB station devices during outage situations, thereby minimizing the time necessary to restore cell sites and/or eNodeB station devices and providing wireless coverage to critical areas and improved customer experience.

As illustrated in FIG. 1, system 100 can include restoration engine 102 that can be coupled to processor 104, memory 106, and storage 108. As depicted, restoration engine 102 can be in communication with processor 104 for facilitating operation of computer executable instructions and components by restoration engine 102, memory 106 for storing data and/or the computer executable instructions and components, and storage 108 for providing longer-term storage of data and/or computer executable instructions. Additionally, system 100 can also receive input 110 for use, manipulation, and/or transformation by restoration engine 102 to produce one or more useful, concrete, and tangible result and/or transform one or more article to different states or things. Further, system 100 can also generate and output the useful, concrete, and tangible result and/or the transformed one or more articles produced by restoration engine 102 as output 112.

Restoration engine 102 can receive as input 110 current and/or historical key performance indicator (KPI) values. Typically these key performance indicator values can include total voice erlangs (e.g., the number of simultaneous users connected to the multiple access wireless communication network/infrastructure via a cell site and/or eNodeB station device—provides an indication regarding traffic demand and/or the number of simultaneous voice calls that are being serviced or supported by a cell site or eNodeB station device in a defined period of time), data traffic traversing through a cell site and/or eNodeB station device, short message service (SMS) traffic using a cell site and/or eNodeB station device as a conduit for communication, carried and offered loads on a cell site and/or eNodeB station device, and the like. Other data that can be utilized by restoration engine 102 can include network topologies (or geographically relevant or specific portions of the multiple access wireless communication network) of the multiple access wireless communication network/infrastructure, and cell relationship information such relationship information based on handover statistics (e.g., the number of transfers of wireless service from a first cell site and/or eNodeB station device to a second cell site and/or eNodeB station device). It should noted that the foregoing key performance indicator values, network topologies, and/or cell relationship information, such as handover statistics can be retrieved from one or more storage facilities (e.g., storage 108) and/or local, centrally located, and/or remotely situated databases. In some embodiments of the subject disclosure the storage facilities and associated data can be stored and/or co-located at a cell site and/or eNodeB station device. In other embodiments of the subject disclosure, requisite data can have been stored to storage component 108. In still other embodiments of the subject disclosure, the necessary data (e.g., key performance indicator values, network topologies, and cell relationship information) can be retrieve and/or obtained from databases maintained in a network cloud infrastructure.

Figure 5:
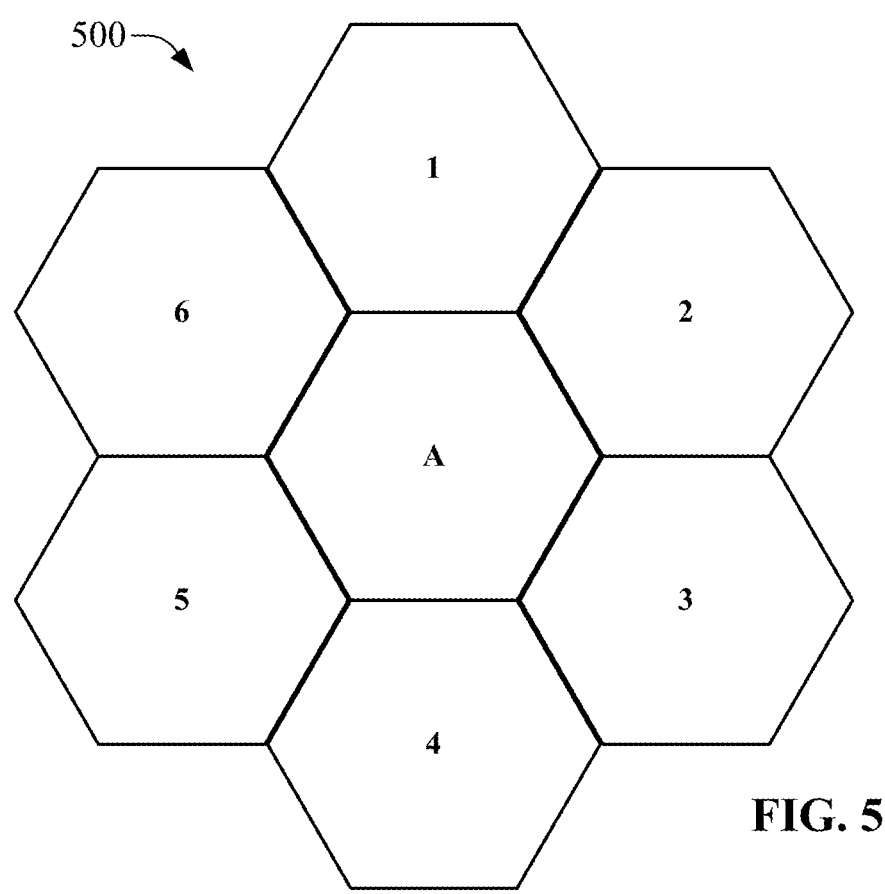
FIG. 5 depicts a wireless cellular structure comprising a reference cell site proximate or neighboring cell sites in accordance with aspects of the subject disclosure.
Figure 6:
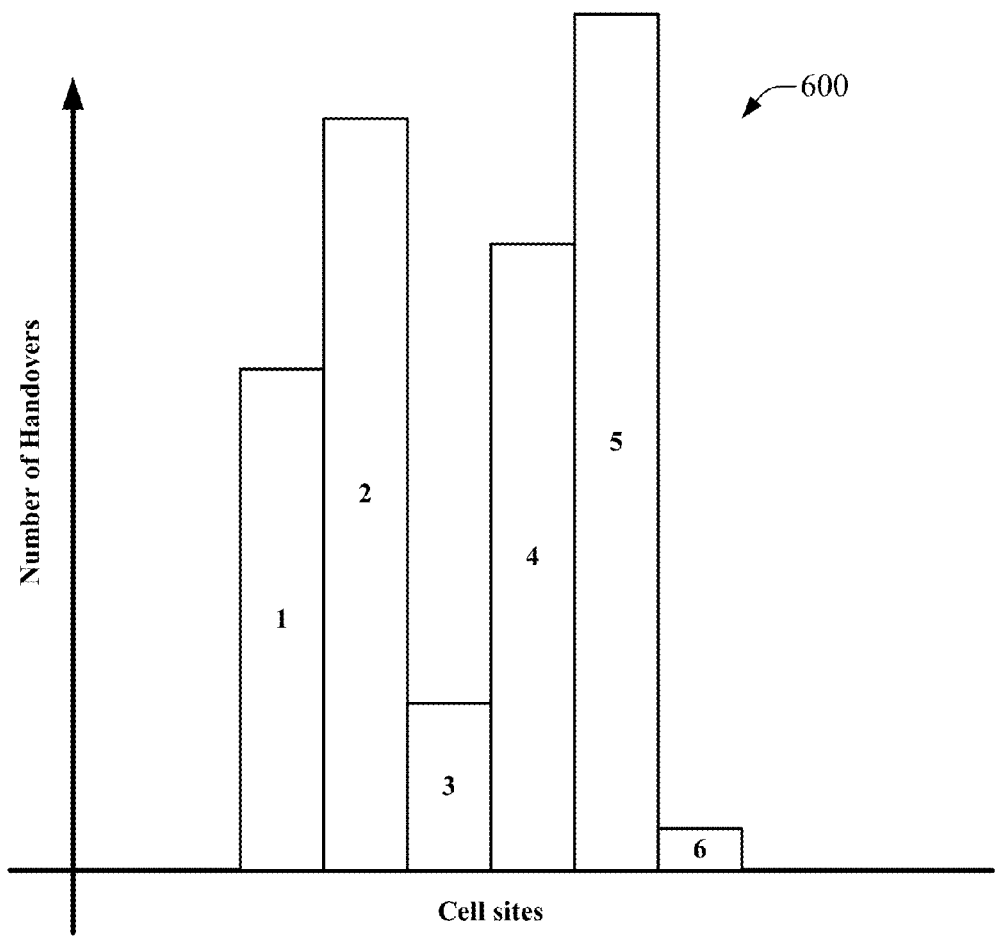
FIG. 6 provides illustration of a histogram representative of a number of wireless handovers that have occurred between a reference cell site and each cell site that is proximate or neighbors the reference cell site in accordance with aspects of the subject disclosure.

With respect to the handover statistics received as input 110 by restoration engine 102, these statistics are typically measured the number of transfers of wireless service from a first cell device to a second cell device and/or from a first eNodeB station to a second eNodeB station. The handover statistics are typically retrieved from a database where the handover statistics are stored for each cell device included in the multiple access wireless communication networks/infrastructure. The handover statistics provide a handover relationship between different or disparate cells and/or eNodeB station devices in the multiple access wireless communication network/infrastructure. For instance and with reference to and as depicted in FIG. 5, reference cell site A and its neighbors cells site 1, cell site 2, cell site 3, cell site 4, cell site 5, and cell site 6. The handover statistics maintained in the one or more databases can be graphically illustrated as a histogram that illustrates from the perspective of a first cell site (e.g. reference cell site A) how many handovers have been facilitated or conducted by reference cell site A to each of its neighboring cell sites (e.g., cell site 1, cell site 2, cell site 3, cell site 4, cell site 5, and cell site 6). It should be appreciated that the histographical representation of the handover statistics between the reference cell site and each respective neighboring cell sites is but one illustrative graphical representation that can be utilized, and is illustrated in FIG. 6.

As will be understood by those of ordinary skill in the art, the time window and/or granularity associated with measurement of the various key performance indicator values can be set by the multiple access wireless communication network/infrastructure operator/carrier. Since a geographically diverse multiple access wireless communication network is a dynamic system that typically remains in a state of flux, the operator/carrier may wish to utilize a brief time window/horizon (e.g., a second (or fractions thereof), a few minutes, a half hour, an hour, . . . ) over which to provide analysis. Alternatively or optionally, the multiple access wireless communication network/infrastructure operator/carrier may wish to set the time window/horizon to capture an wider view of the operational history of the geographically diverse multiple access wireless communication network/infrastructure (e.g. over the last month, three months, six months, nine months, etc.). In relation to granularity, this aspect can also be set by the multiple access wireless communication network/infrastructure provider/carrier, and typically pertains to the sampling rate for the acquisition of the key performance indicator values persisted or stored in the database (e.g., storage 108). Illustrative sampling rates for the acquisition of key performance indicator values can include collecting respective key performance indicator values every second, every minute, every thirty minutes, every forty five minutes, every hour, every 90 minutes, every six hours, every twelve hours, and the like.

Restoration engine 102 having received as input 110 key performance indicator values, network topologies, and/or cell site relationship information can apply a generic filtering algorithm/process, such as, a simple moving average algorithm/process, a weighted moving average algorithm/process, an exponential moving average algorithm/process, and the like, to filter the key performance indicator values. The generic filtering algorithm/process should combine current key performance indicator values with historical key performance indicator values within a specified or defined time window, defined time horizon, defined time period, to produce a post processed value for the key performance indicator metric denoted as (Filtered_KPI)$_j$ for each reference cell j.

Using the handover statistics (e.g., the number of transfers of wireless communications that have occurred in a defined period of time between a reference cell site (or reference eNodeB station device) and each cell site (or each eNodeB station device) that neighbors the reference cell site (or eNodeB station device)) retrieved and/or obtained as input 110, restoration engine 102 can apply a similar generic filtering algorithm/process (e.g., a simple moving average algorithm/process, a weighted moving average algorithm/process, an exponential moving average algorithm/process, etc.) to the received or obtained handover statistics to produce a processed value for the handover statistics. The post processed handover metric for a reference cell site j can be denoted as (Filtered_HO)$_j$.

Additionally, restoration engine 102 can construct a distance weighting factor that weights the contributions from neighboring cell sites (and/or eNodeB station devices) based on a distance between a reference cell site j (and/or eNodeB station device) and each of its neighboring cell sites (and/or eNodeB station devices). The metric generated by restoration engine 102 can be determined as follows: first, restoration engine 102, using a network topology received as input 110, can determine the distance between a reference cell site j and each of its neighboring cell sites as defined in the network topology. This set of distances can be denoted as $D_{net\_top}$. Next, restoration engine 102, using the earlier received handover statistics, for example, can identify the number of neighbor cell sites that have contributed to a percentage value (x %) of the total handovers that have occurred in a defined unit of time. Based on the percentage value of contribution provided by neighboring cell sites with respect to the reference cell site j and the earlier determined set of distances (e.g., $D_{net\_top}$) restoration engine 102 can determine the distance from reference cell site j to each neighboring cell site that has contributed to the defined percentage value (x %) of the total number of handovers. This set of distances can be denoted as $D_{HO\_stat}$. Using the set of distances $D_{HO\_stat}$, restoration engine 102 can construct a weighting function for the reference cell site j. The weighting function can be denoted as $W_j$ and measures the cardinality of the set of distances $D_{HO\_stat}$.

Restoration engine 102 can thereafter determine a cell site ranking score value for the reference cell site j as: Cell_Ranking_Score$_j$=(Filtered_KPI$_j$+Filtered_HO$_j$)×W$_j$. Restoration engine 102, using the defined cell ranking score, can also determine the eNodeB station device ranking score value for a reference eNodeB station device j as: eNodeB_Ranking_Score$_j$=$\Sigma_{i=1}^{N_i}$Cell_Ranking_Score$_i$, where $N_i$ is the number of cell sites controlled by reference eNodeB station device j. As has been noted above, restoration engine 102 (and system 100) provides both the cell site ranking score value as well as the eNodeB station device ranking score value in real time.

Using the determined cell site ranking score value as well as the eNodeB station device ranking score value, restoration engine 102 in conjunction with a graphical user interface (GUI) can color code the respective cell site ranking score and eNodeB ranking score to provide operations personnel a better perspective as to the priority or preference ordering in which respective cell sites and/or eNodeB station devices should be restored. For instance, high priority cell sites and/or eNodeB station devices (e.g., those cell sites and/or eNodeB station devices that are critical or crucial for network operations within a defined geographical area) can be represented in red, while low priority cell sites and/or eNodeB station devices can be represented in a more neutral color, such as white. It should be appreciated in regard to display of the color coded ordering or ranking that other color combinations and/or color gradations can be utilized without departing from the intent and scope of the subject disclosure.

Figure 2:
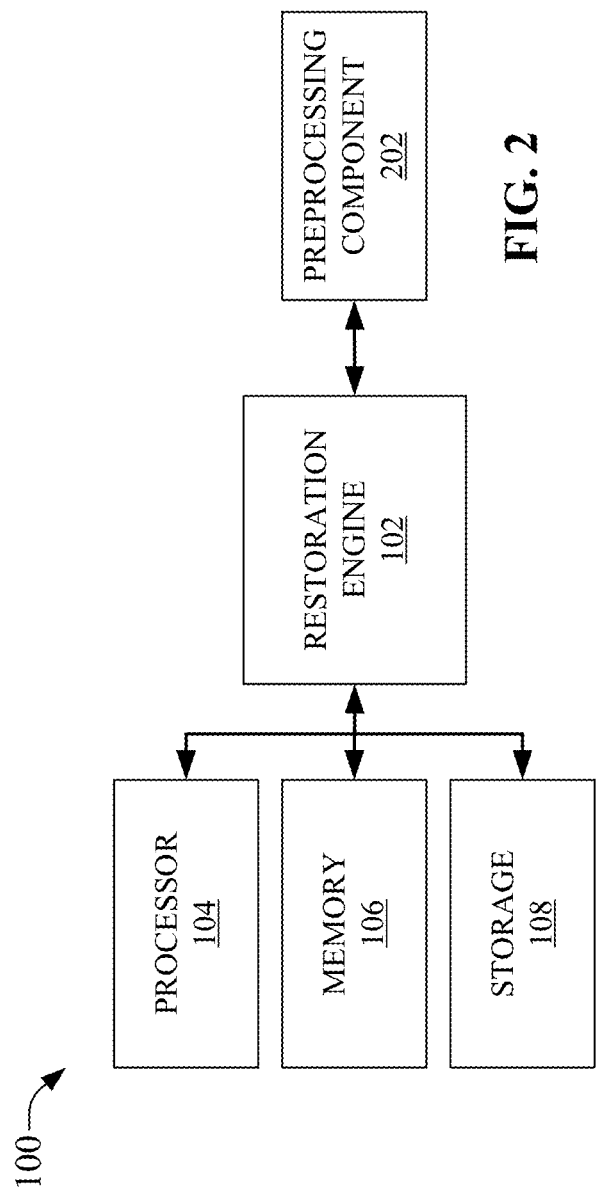
FIG. 2 is a further depiction of a system for restoring cell sites and/or eNodeB station devices after a scheduled and/or unscheduled wireless communication outage in accordance with aspects of the subject disclosure.

FIG. 2 provides further illustration of system 100 in accordance with an aspect of the subject disclosure. As illustrated system 100 can include restoration engine 102 that can, as described above, be communicatively coupled to processor 104, memory 106, and storage 108. Additionally system 100 can include preprocessing component 202 that can be in communication with restoration engine 102 and can operate in conjunction with restoration engine 102. Preprocessing component 202 can receive, as input 110, current and/or historical key performance indicator values, such as total voice erlangs, data traffic metrics, short message service (SMS) traffic metrics, carried and/or offered load metrics on a particular cell site, for example. As has been noted above, current and/or historical key performance indicator values can be retrieved and/or obtained from one or more databases that can be local to system 100 and/or can be located in some central location geographically distant from system 100. Further, preprocessing component 202 can also receive, as input 110, handover statistics—the total number of wireless handovers that can have occurred in a defined time window or time period between a reference cell site j and each cell site that is proximate or neighbors reference cell site j.

Preprocessing component 202 on receipt of current and/or historical key performance indicator values can filter these values using a generic filtering algorithm/process. Examples of such filtering algorithms/processes can include a simple moving average algorithm/process, a cumulative moving average algorithm/process, a weighted moving average algorithm/process, an exponential weighted moving average algorithm/process, and the like. These generic algorithms/processes can be utilized by preprocessing component 202 to combine current and/or historical key performance indicator information within a defined or specified time window to produce a post processed value for the key performance indicator metric. This metric can be denoted as (Filtered_KPI)$_j$ for a particular cell site or reference cell site j.

Preprocessing component 202 can also on receipt, as input 110, of handover information and/or statistics can apply a similar generic filtering algorithm/process to the received handover information and/or statistics to produce a post processed handover metric. The received handover statistics and/or information can include the total number of handovers that have occurred in a defined time window between a reference cell site j and each of its neighboring cell sites, wherein this information and/or these statistics are filtered and weighted using the generic filtering algorithm/process (e.g., one or more of a simple moving average algorithm/process, a cumulative moving average algorithm/process, a weighted moving average algorithm/process, an exponential weighted moving average algorithm/process, and the like). The filtering and weighting of the handover information and/or statistics produces a post processed handover metric for a particular reference cell site j can be denoted as (Filtered_HO)$_j$.

Figure 3:
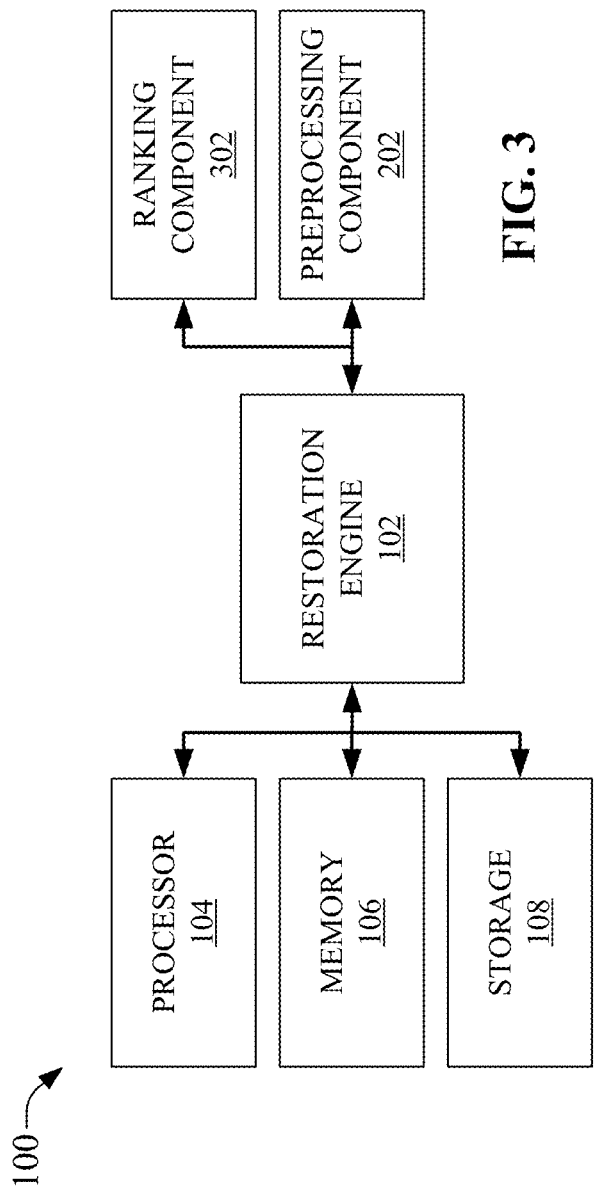
FIG. 3 illustrates a further system for restoring cell sites and/or eNodeB station devices after a scheduled and/or unscheduled wireless communication outage in accordance with aspects of the subject disclosure.

Preprocessing component 1202 can thereafter supply or forward the determined metrics (e.g., Filtered_KPI$_j$ and/or Filtered_H0$_j$) to ranking component 302 for further processing as described in FIG. 3.

FIG. 3 provides additional illustration of system 100 in accordance with a further aspect of the subject disclosure. As illustrated, system 100 can include ranking component 302 that can operate in collaboration or conjunction with restoration engine 102 which in turn can be in communication with processor 104, memory 106, and/or storage 108. Ranking component 302 using one or more geographically relevant network topology received as input 110 from one or more databases maintained, for example, by a multiple access wireless communication network/infrastructure provider/carrier can construct a distance weighting factor that weights the contributions from neighboring cell sites based on, or as a function of, the distances between a reference cell site j and each cell site that neighbors reference cell site j. This metric can be determined as follows: initially, ranking component 302, using the geographically relevant network topology information received as input 110, can determine a distance between a reference cell site j and each of its neighboring cell sites as defined in the geographically relevant network topology. This set of distances can be denoted as $D_{net\_top}$. Subsequently, using the handover statistics and/or handover relationship information, also received as input 110, ranking component 302 can identify, from the perspective of a reference cell site j, the number of neighboring cell sites that have contributed to a percentage value (x %) of the total handovers that have occurred between the reference cell site j and cell sites in proximity of reference cell site j within a defined time window. Based on, or as a function of, the number of neighboring cell sites that have contributed to a percentage value (x %) of the total handovers that have occurred between the reference cell site j and cell sites in proximity to reference cell site j and the set of distances $D_{net\_top}$, ranking component 302 can determine the distances from the reference cell site (e.g., reference cell site j) to each and every cell site that has contributed to the percentage value (x %) of the total handovers that have occurred between the reference cell site j and cell sites proximate to the reference cell site j. This further set of distances that can be denoted as $D_{HO\_stat}$, can be used to construct a weighting function for the reference cell site j. The weighting function can be denoted as $W_j$. The weighting function $W_j$ measures the cardinality of the further set of distances $D_{HO\_stat}$.

Ranking component 302 can thereafter utilize the ascertained or determined post processed value for the key performance indicator metric (e.g. (Filtered_KPI)$_j$ determined for each reference cell site j), the determined or ascertained post processed value for the handover metric for reference cell site j (e.g., (Filtered_HO)$_j$), and the weighting function $W_j$ that measures the cardinality of the further set of distances (e.g., $D_{HO\_stat}$) to determine a cell site ranking score value for a reference cell site j (e.g., Cell_Ranking_Score$_j$=(Filtered_KPI$_j$+Filtered_HO$_j$)×W$_j$). Additionally, ranking component 302, using the determined Cell_Ranking_Score, can also determine the eNodeB station device ranking score for a particular reference eNodeB station device. The eNodeB station device ranking score can be determined as: eNodeB_Ranking_Score$_j$=$\Sigma N_{i=1}^{Ni}$Cell_Ranking_Score$_i$, where $N_i$ is the number of cell sites controlled by reference eNodeB station device j. The resultant cell site ranking score value (e.g., Cell_Ranking_Score) and the eNodeB station device ranking score (e.g., eNodeB_Ranking_Score) can thereafter be conveyed and processed by interface component 402, as described below in FIG. 4.

Figure 4:
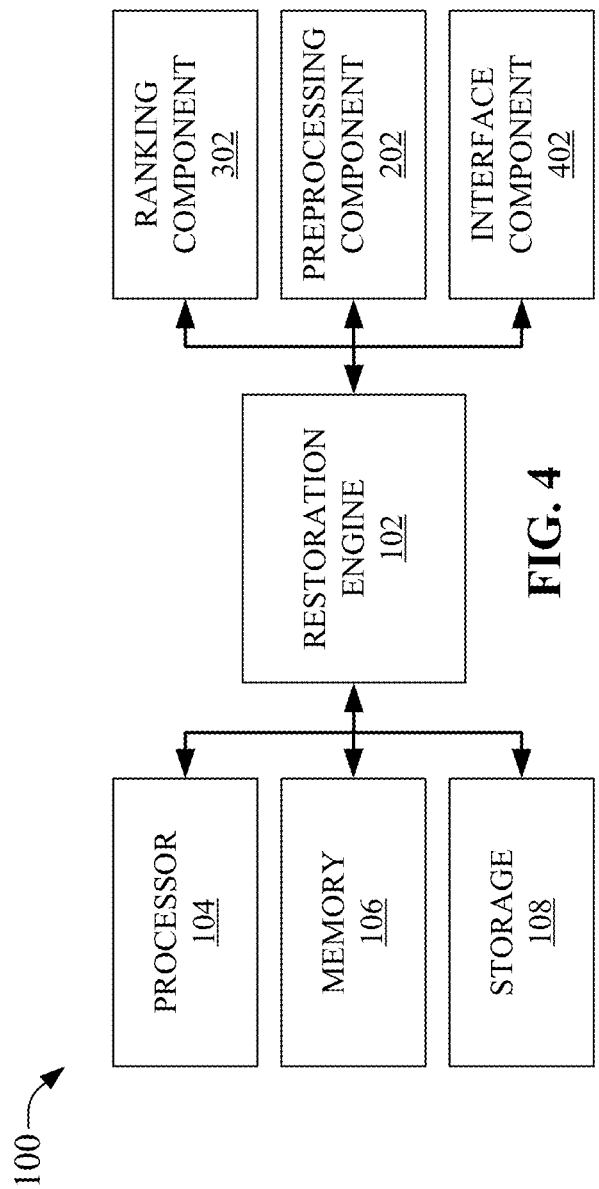
FIG. 4 is still yet a further illustration of a system for restoring cell sites and/or eNodeB station devices after a scheduled and/or unscheduled wireless communication outage in accordance with aspects of the subject disclosure.

FIG. 4 provides further illustration of system 100 in accordance with another aspect of the subject disclosure. As illustrated, system 100 can include interface component 402 that can operate in collaboration with restoration engine 102. As has been noted above, and as depicted in FIG. 4 interface component 402 can be communicatively coupled to restoration engine 102 which in turn can be communicatively coupled to processor 104, memory 106, and storage 108. Interface component 402 can receive the resultant cell site ranking score value (e.g., Cell_Ranking_Score) and the eNodeB station device ranking score (e.g., eNodeB_Ranking_Score) generated by ranking component 302 and thereafter produce color coded output in relation to the cell site ranking score value and the eNodeB station device ranking score. In accordance with an embodiment, interface component 402 can generate and display cell sites with high cell site ranking score values in the color red, thereby denoting the fact the such cell sites are of crucial importance and thus should be restored in priority to other cell sites with lower cell sites with commensurately lower cell site ranking score values. Interface component 402 can perform similar operations in connection with the eNodeB station device ranking score, wherein interface component 402 can generate and cause a display device to display a tabulated representation of a color coded ranking or ordering of eNodeB station devices, prioritizing those eNodeB station devices that should be restored in preference to other eNodeB stations that can await restoration at a subsequent time.

FIG. 5 depicts an illustrative wireless cellular structure 500 comprising a reference cell site A and its proximate or neighboring cell sites enumerated as cell site 1, cell site 2, cell site 3, cell site 4, cell site 5, and cell site 6. From the illustrative cellular structure 500, system 100 can determine the respective distances between reference cell site A and each of cell site 1, cell site 2, cell site 3, cell site 4, cell site 5, and cell site 6. Additionally, system 100 can determine handover relationship information between reference cell site A and each of neighboring cell site 1, cell site 2, cell site 3, cell site 4, cell site 5, and cell site 6. The handover relationship information can be represented as a histogram as depicted in FIG. 6.

FIG. 6 depicts an illustrative histogram 600 representative of the number of wireless handovers that have occurred between a reference cell site (e.g., cell site A as illustrated in FIG. 5) and each cell site that is proximate or neighbors the reference cell site (e.g., cell site 1, cell site 2, cell site 3, cell site 4, cell site 5, and cell site 6, as depicted in FIG. 5) within a defined time horizon or defined time window. As will be observed in this instance, the preponderance of wireless handovers that have occurred between a reference cell site and each of its respective neighbors have occurred between the reference cell site and cell site 5, whereas the least number of wireless handovers have been between the reference cell site and cell site 6.

Figure 7:
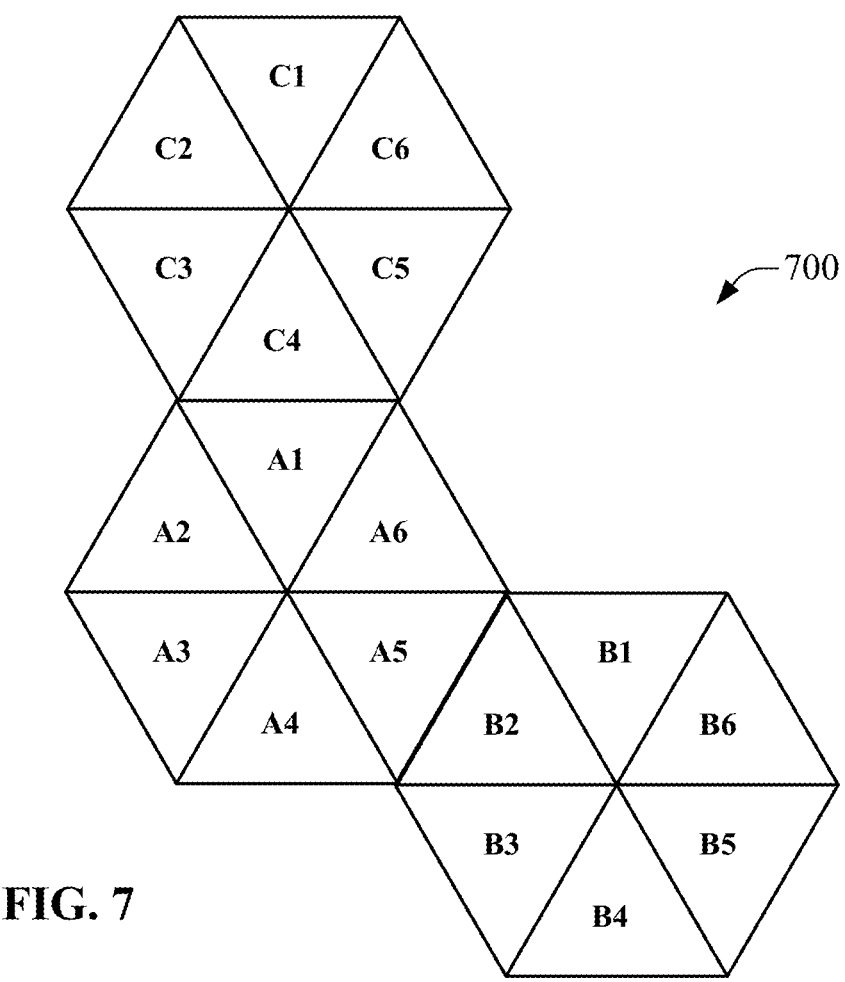
FIG. 7 provides illustration of a set of contiguous cell sites in accordance with aspects of the subject disclosure.

FIG. 7 illustrates contiguous cell sites 700. In this depiction, contiguous cell sites 700 can include cell sites A1-A6, cell sites B1-B6, and cell sites C1-C6, wherein each of cell sites A1-A6, cell sites B1-B6, and cell sites C1-C6 can be under control of individual and respective eNodeB station devices. In this illustration, through the facilities and functionalities provided by system 100, should a disruption occur with respect to cell sites A1-A6, cell sites B1-B6, and cell sites C1-C6, system 100 may determine, as a function of a Cell_Ranking_Score and/or a eNodeB_Ranking_Score generated by system 100, that in order to orderly restore wireless service to the entirety of the coverage area of the three cell sites (e.g., cell sites A1-A6, cell sites B1-B6, and cell sites C1-C6), it might be beneficial to prioritize restoration of cell sites A1 and A5, since these cell sites can also be utilized to service coverage areas that prior to the outage were covered by cell sites B2 and C4 respectively.

Figure 8:
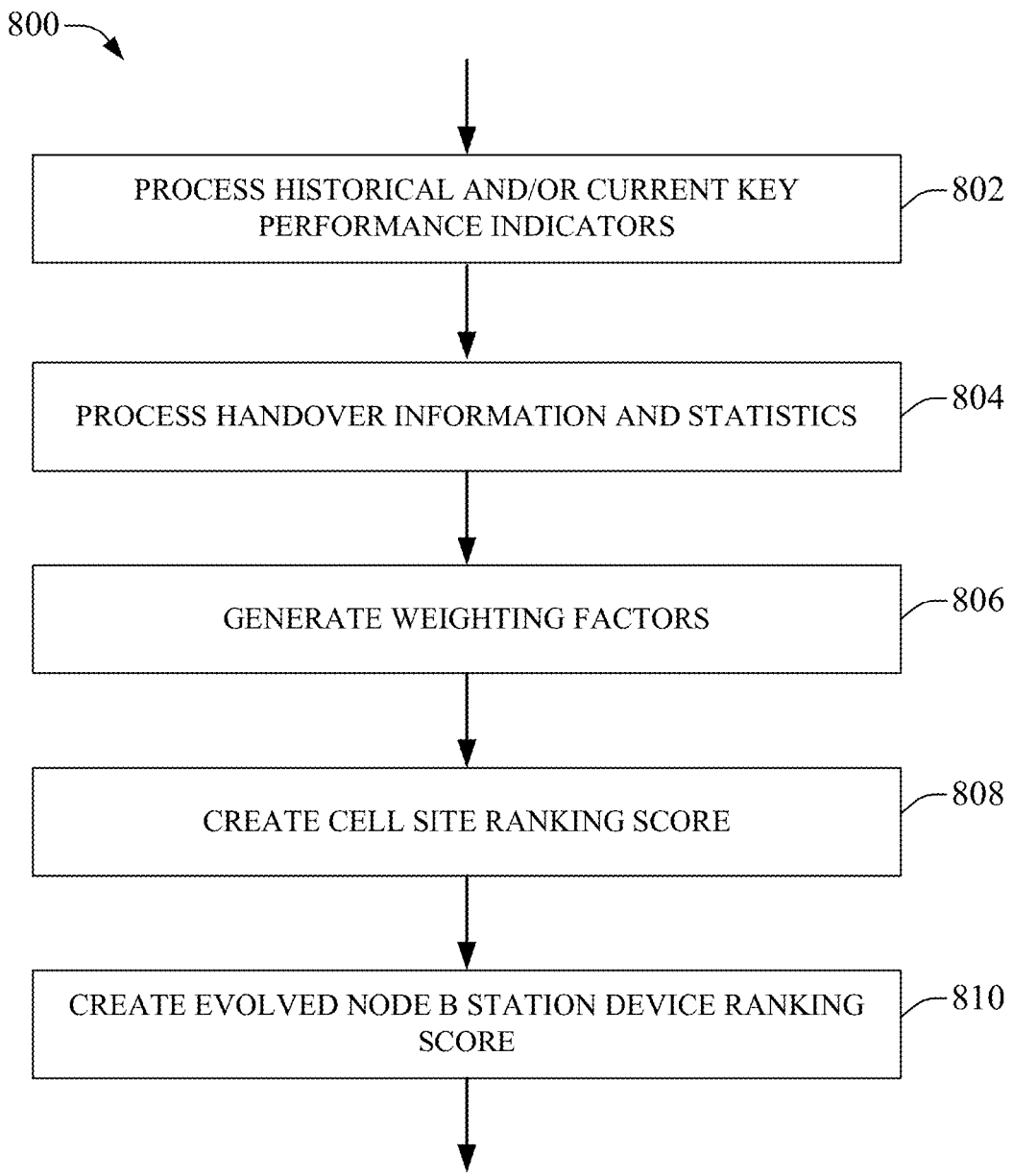
FIG. 8 illustrates a method for restoring cell sites and/or eNodeB station devices after a scheduled and/or unscheduled wireless communication outage in accordance with aspects of the subject disclosure.
Figure 9:
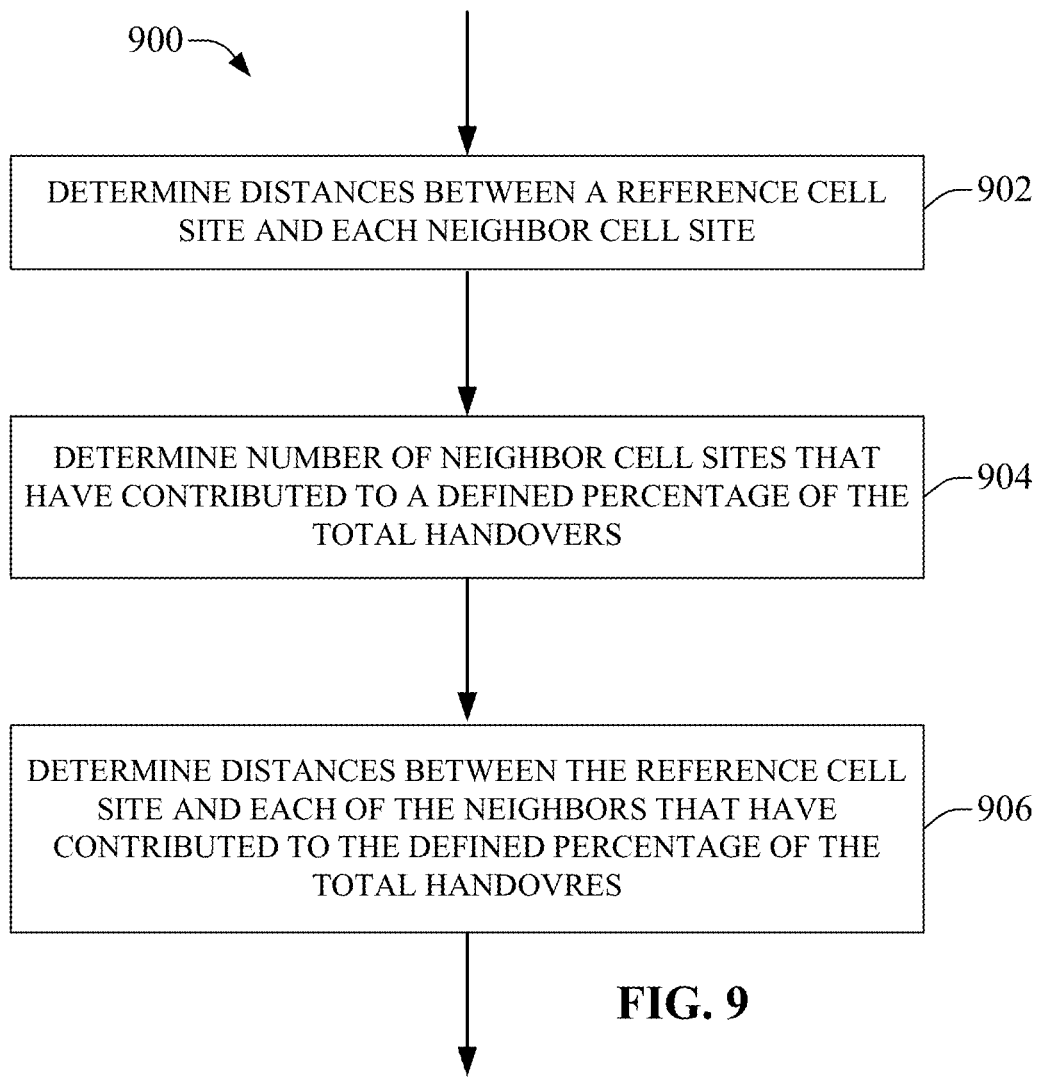
FIG. 9 illustrates a further method for restoring cell sites and/or eNodeB station devices after a scheduled and/or unscheduled wireless communication outage in accordance with aspects of the subject disclosure.

In view of the example system(s) described above, example method(s) that can be implemented in accordance with the disclosed subject matter can be better appreciated with reference to flowcharts in FIGS. 8-9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 8 illustrates a method 800 for restoring cell sites and/or eNodeB station devices after a scheduled and/or unscheduled wireless communication outage. Method 800 can commence at 802 where current and/or historical key performance indicator values can be processed or filtered using a generic filtering algorithm/process, such as a weighted moving average algorithm/process, an exponential weighted moving average algorithm/process, and the like. The generic filtering algorithm/process can combine the current and/or historical key performance indicator values over a defined time period to produce a post processed value for the key performance indicator metric that can be denoted as (Filtered_KPI) for each cell site. At 804 handover information and/or statistics can be processed, wherein a generic filtering algorithm/process similar to that utilized to filter the current and/or historical key performance indicator values can be applied to the handover information and/or statistics. The results of the application of the generic filtering algorithm/process to the handover information and/or statistics can be a post processed handover metric denoted as (Filtered_HO) for each cell site that is included in the handover information and/or statistics. At 806, weighting factors can be generated. The weighting factors can be generated by utilizing one or more geographically relevant network topology and constructing a distance weighting factor that weights the contributions from neighboring cell sites based on, or as a function of, the distance between a reference cell site and each of its neighbors. This metric can be determined as follows: using the one or more geographically relevant network topology information obtained for example from a database typically maintained by a multiple access wireless communication network provider/carrier, a distance between a reference cell site and each of its neighboring cell sites defined in the network topology can be determined. This set of distances can be denoted as $D_{net\_top}$. Next, using the handover statistics, also maintained in one or more databases typically maintained by the multiple access wireless communication network provider/carrier, the number of neighbor cell sites that have contributed to a percentage value (x %) of the total handovers that have occurred during a defined period of time can be identified. Based on, or as a function of, the handover statistics and the set of distances between the reference cell site and each of its neighboring cell sites, a respective distance from the reference cell site and to each of the neighboring cell sites that have contributed to a percentage value (x %) of the total handovers can be determined. This set of distances can be denoted as $D_{HO\_stat}$. Using this set of distances (e.g., $D_{HO\_stat}$), a weighting function for the reference cell site can be constructed. This weighting function can be denoted as $W_j$ for reference cell site j. The weighting function $W_j$ measures the cardinality of the set of distances $D_{HO\_stat}$.

At 808 a cell site ranking score for the reference cell site j can be created. The cell site ranking score value can be represented as: $Cell\_Ranking\_Score_j = (Filtered\_KPI_j + Filtered\_HO_j) \times W_j$. At 810 as function of the cell site ranking score an eNodeB station device ranking score can also be generated or constructed. The eNodeB station device ranking score can be represented as: $eNodeB\_Ranking\_Score_j = \Sigma_{i=1}^{N_i} Cell\_Ranking\_Score_i$, where $N_i$ is the number of cell sites controlled by reference eNodeB station device j. The cell site ranking score and the eNodeB station device ranking score can thereafter be output and utilized by a graphical user interface to represent in table form, for instance, the relative importance of the reference cell site and/or the reference eNodeB station device.

FIG. 9 illustrates a further method 900 for restoring cell sites and/or eNodeB station devices after a scheduled and/or unscheduled wireless communication outage. Method 900 can begin at 902, where a weighting factor $W_j$ for a reference cell site can be determined, by using one or more geographically relevant network topologies and determining distances between a reference cell site j and each of its neighboring cell sites. This set of distances can be denoted as $D_{net\_top}$. At 904, using handover statistics and/or other handover relationship information a determination can be made regarding the number of neighboring cell sites that have contributed to a defined percentage value (x %) of the total handover that have occurred between the reference cell site j and each of its neighboring cell sites. At 906, as a function of, or based at least in part on, the set of distances denoted as $D_{net\_top}$ and the number of neighboring cell sites that have contributed to a defined percentage value (x %) of the total number of handovers that have occurred between the reference cell site j and each cell site that is in proximity or neighbors reference cell site j, a further set of distances can be generated; this further set of distances can be denoted as $D_{HO\_stat}$. Using the further set of distances (e.g., $D_{HO\_stat}$) a weighting function $W_j$ can be produced. The weighting function $W_j$ measures the cardinality (e.g., the number of elements included in the set) of the further set of distances $D_{HO\_stat}$.

Figure 10:
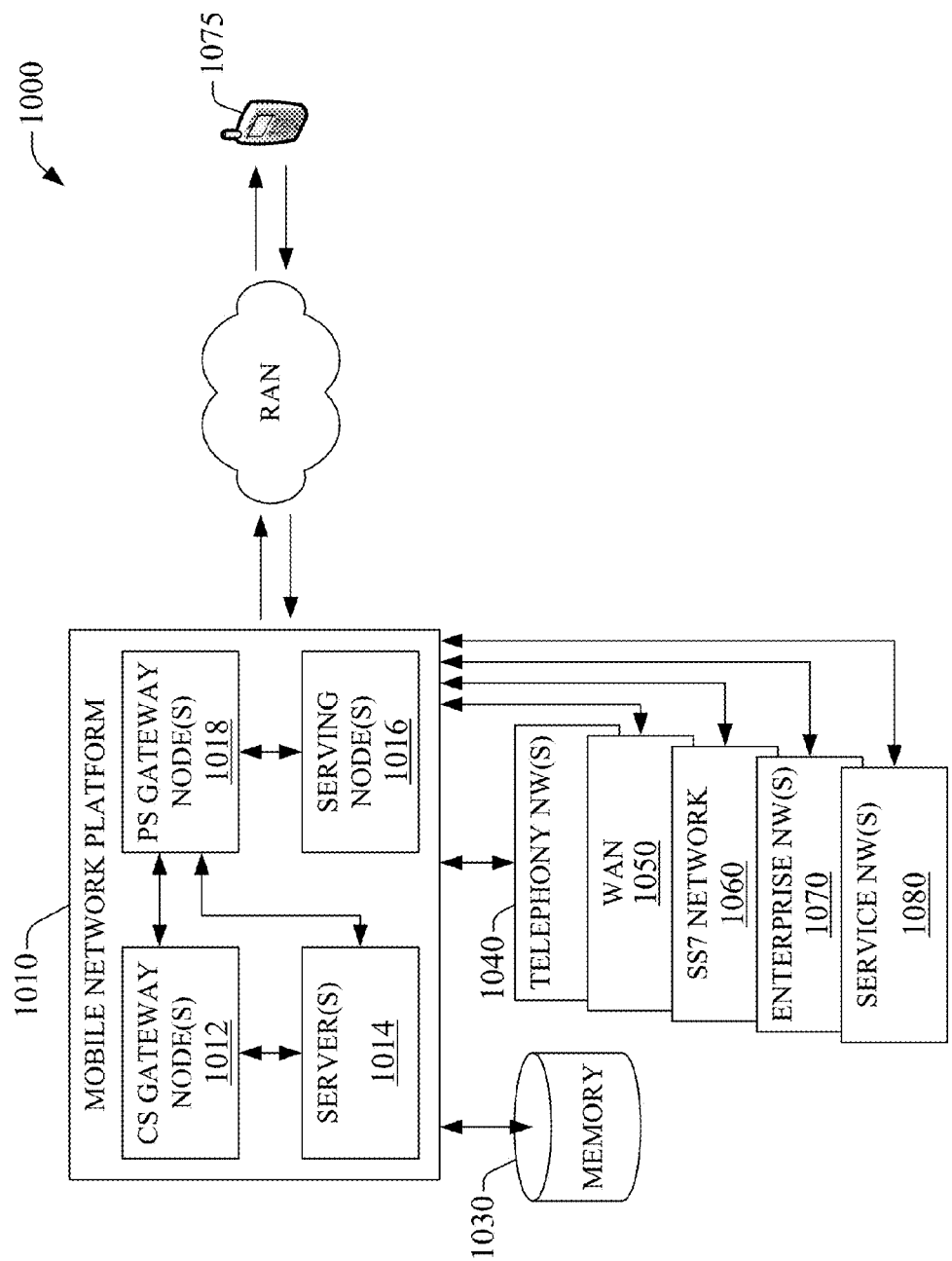
FIG. 10 is a block diagram of an example embodiment of a mobile network platform to implement and exploit various features or aspects of the subject disclosure.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload radio access network resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

Figure 11:
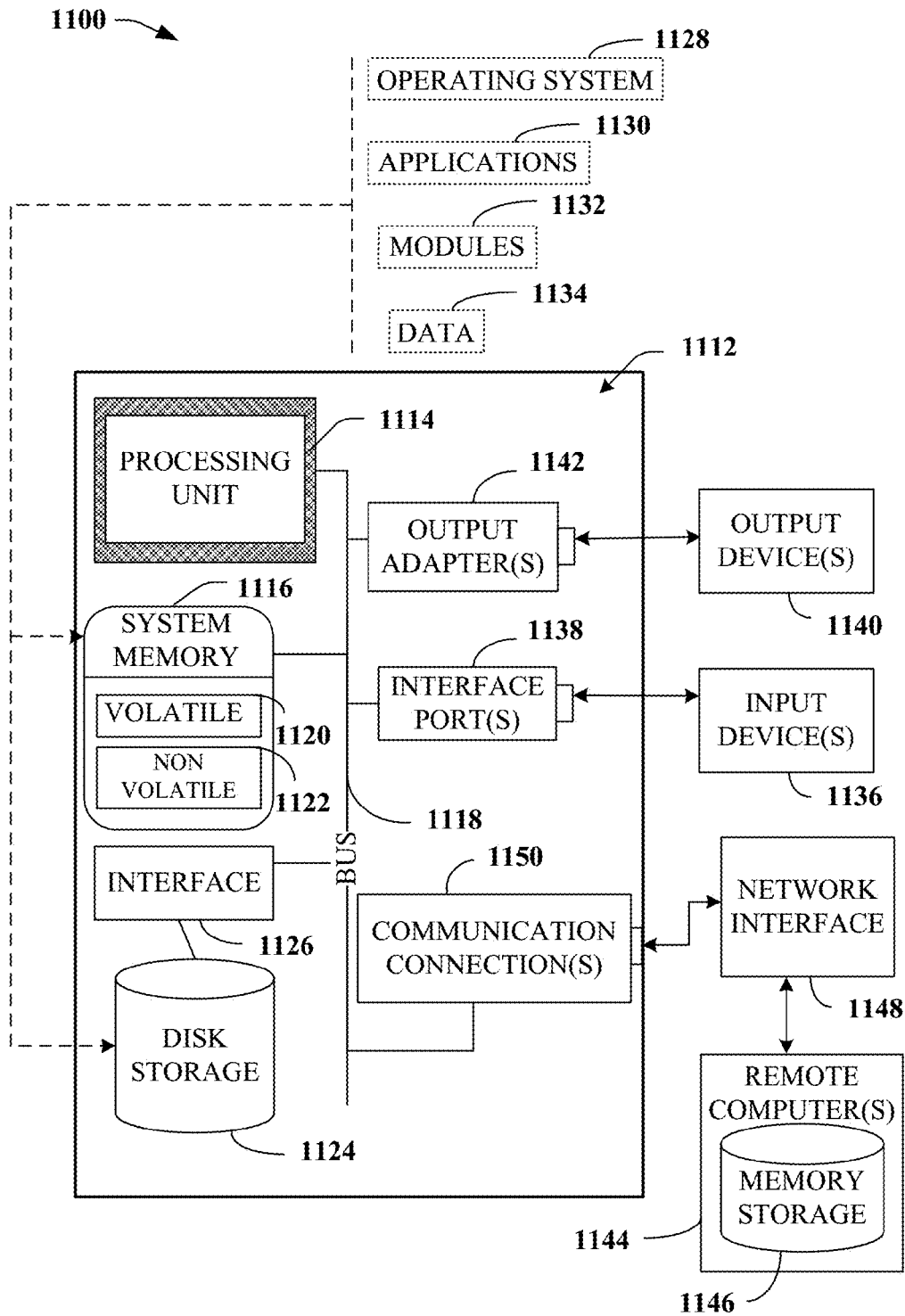
FIG. 11 illustrates a block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1120 (see below), non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, part of the hardware of system 100, includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 can include volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 can also include removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. As an example, system 100 can include a user interface embodied in a touch sensitive display panel allowing a user to interact with computer 1112. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 include, for example, a serial port, a parallel port, a game port, a universal serial bus (USB), an infrared port, a Bluetooth port, an IP port, or a logical port associated with a wireless service, etc. Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, cloud service, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected by way of communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femtocell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a memory to store executable instructions; and
   a processor, coupled to the memory, that facilitates execution of the executable instructions to perform operations, comprising:
      receiving a current key performance indicator value, topology data representing a network topology relating to a first cell device, and statistical data representing a statistic related to a number of transfers of wireless service from the first cell device to a second cell device;
      filtering the current performance indicator value for the first cell device over a defined time period to produce a filtered key performance indicator metric for the first cell device;
      filtering the statistical data over the defined time period to produce filtered statistical data representing a filtered statistic for the first cell device of the number of transfers of wireless service from the first cell device to the second cell device;
      determining, as a function of the topology data, a weighting factor for the first cell device based on distance data representing a distance between the first cell device and the second cell device and the number of transfers of wireless service from the first cell device to the second cell device; and
      initiating display of a cell ranking score for the first cell device as a function of the weighting factor for the first cell device, the filtered key performance indicator metric for the first cell device, and the filtered statistical data for the first cell device.

2. The system of claim 1, wherein the operations further comprise receiving a historical key performance indicator value and filtering the historical performance indicator value for the first cell device and the current key performance indicator value for the first cell device over the defined time period to produce the filtered key performance indicator for the first cell device.

3. The system of claim 1, wherein the operations further comprise aggregating the cell ranking score for cell devices included in a coverage area of a base station device to produce a base station device ranking score for the base station device.

4. The system of claim 3, wherein the operations further comprise initiating display of the base station device ranking score.

5. The system of claim 3, wherein the first cell device and the second cell device are included in the coverage area of the base station device, and the base station device is included in the topology data.

6. The system of claim 1, wherein the current key performance indicator value is a measure of a current load on the first cell device.

7. The system of claim 1, wherein the current key performance indicator value is a metric related to a number of concurrent voice calls that are being serviced by the first cell device during the defined time period.

8. A method, comprising:
   obtaining, by a system comprising a processor, a historical key performance indicator value, topology data representing a network topology, and statistical data representing a metric related to a number of transfers of wireless service from a reference cell device to a neighboring cell device;

applying a filtering process to the historical performance indicator value for the reference cell device to produce a filtered key performance indicator metric for the reference cell device;

applying the filtering process to the statistical data for the reference cell device to produce a filtered handover metric related to the number of transfers;

determining a weighting factor for the reference cell device using the topology data and the number of transfers, wherein the topology data enables determination of a distance between the reference cell device and the neighboring cell device; and initiating display of a cell ranking score for the reference cell device as a function of the weighting factor for the reference cell device, the filtered handover metric for the reference cell device, and the filtered key performance indicator metric for the reference cell device.

9. The method of claim 8, wherein the filtering process is a weighted moving average process.

10. The method of claim 8, wherein the filtering process is an exponential weighted moving average process.

11. The method of claim 8, further comprising, aggregating the cell ranking score for the reference cell device with a cell ranking score determined for the neighboring cell device to determine an eNodeB station device ranking score for a reference eNodeB station device, wherein the reference eNodeB station device comprises the reference cell device.

12. The method of claim 11, further comprising, initiating display of the eNodeB station device ranking score for the reference eNodeB station device, wherein the eNodeB station ranking score is color coded as a function of a priority ordering placed on restoration of the reference eNodeB station device relative to the neighboring cell device included in a geographic segment of a multiple access wireless communication network represented by the topology data.

13. The method of claim 8, wherein the historical key performance indicator value is a metric related to a quantity of data traffic passing through the reference cell device for a defined unit of time.

14. The method of claim 8, wherein the historical key performance indicator value is a metric related to an amount of data related to a text message service using the reference cell device as a conduit for communication with a network device associated with a multiple access wireless communication network.

15. A computer readable storage device comprising executable instructions that, in response to execution, cause a system comprising a processor to perform operations, comprising:

filtering a current key performance indicator value for a reference cell device and a historical key performance indicator value for the reference cell device to produce a filtered key performance indicator metric for the reference cell device related to a defined time horizon;

filtering statistical data to produce filtered statistical data representing a filtered statistic for the reference cell device related to the defined time horizon;

determining a weighting factor for the reference cell device as a function a distance between the reference cell device and a cell device in proximity to the reference cell device, wherein the distance is obtained from topology data representing a network topology that comprises the reference cell device and the cell device in proximity to the reference cell device; and initiating display of a ranking score for the reference cell device, wherein the ranking score for the reference cell device is determined as a function of the weighting factor for the reference cell device, the filtered statistical data for the reference cell device, and the filtered key performance indicator metric for the reference cell device.

16. The computer readable storage device of claim 15, wherein the ranking score for the reference cell device is color coded to indicate a comparative ordering between the reference cell device and the cell device in proximity to the reference cell device.

17. The computer readable storage device of claim 15, wherein the operations further comprise adding the ranking score for the reference cell device and another ranking score determined for the cell device proximate with the reference cell device to determine a reference base station device ranking score, wherein a reference base station device broadcast area comprises a broadcast area of the reference cell device and the cell device proximate to the reference cell device.

18. The computer readable storage device of claim 17, wherein the reference base station device ranking score is color coded to indicate a comparative ordering between the reference base station device and another base station device included in the network topology data.

19. The computer readable storage device of claim 15, wherein the current performance value is related to a defined quantity of data passing through the reference cell device during the defined unit of time.

20. The computer readable storage device of claim 15, wherein the historical performance value is offered load data related to an available capacity on the reference cell device.

* * * * *